United States Patent
Diep et al.

(10) Patent No.: US 10,766,435 B2
(45) Date of Patent: Sep. 8, 2020

(54) SEALING CLIP

(71) Applicant: Newfrey LLC, New Britain, CT (US)

(72) Inventors: Tien T. Diep, West Bloomfield, MI (US); Jason A. Meyers, Shelby Township, MI (US); Gerard J. Kmita, Allen Park, MI (US); Andrew Cornell Heidacker, Commerce Township, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 15/794,527

(22) Filed: Oct. 26, 2017

(65) Prior Publication Data

US 2018/0339665 A1 Nov. 29, 2018

Related U.S. Application Data

(60) Provisional application No. 62/511,746, filed on May 26, 2017.

(51) Int. Cl.
*B60R 13/06* (2006.01)
*F16B 2/22* (2006.01)
(Continued)

(52) U.S. Cl.
CPC .............. *B60R 13/06* (2013.01); *B60J 10/36* (2016.02); *F16B 2/22* (2013.01); *F16B 5/128* (2013.01); *F16B 21/086* (2013.01)

(58) Field of Classification Search
CPC .......... B60R 13/06; F16B 2/22; F16B 21/086; F16B 5/128
See application file for complete search history.

(56) References Cited

U.S. PATENT DOCUMENTS

| 3,230,592 A | 1/1966 | Hosea |
| 3,309,955 A | 3/1967 | Turnbull et al. |

(Continued)

FOREIGN PATENT DOCUMENTS

| AU | 7167774 | 7/1973 |
| DE | 10 2011 121416 A1 | 6/2013 |

(Continued)

OTHER PUBLICATIONS

Extended European Search Report dated Jul. 17, 2018 in corresponding European Application No. 18172788.4.

(Continued)

*Primary Examiner* — Robert Sandy
*Assistant Examiner* — David M Upchurch
(74) *Attorney, Agent, or Firm* — Harness, Dickey & Pierce, P.L.C.

(57) ABSTRACT

A clip includes a base that is elongated in a longitudinal direction, a post connected to the base at a proximal end of the post. The post extends away from the base and terminates at a distal end of the post. The clip further includes a first finger and a second finger both connected on opposite sides of the post and extending away from the post toward the base in the longitudinal direction. The clip also includes an elongated foot connected to the base on a side of the base opposite the post. The clip also includes an umbrella seal connected to the base that has a sealing lip around a periphery of the base that extends away from the base. The base, the elongated foot and the first finger and the second finger of the clip extend along the same longitudinal direction of the clip.

20 Claims, 5 Drawing Sheets

(51) Int. Cl.
  *F16B 21/08* (2006.01)
  *F16B 5/12* (2006.01)
  *B60J 10/36* (2016.01)

(56) References Cited

U.S. PATENT DOCUMENTS

| | | | | |
|---|---|---|---|---|
| 3,860,999 A * | 1/1975 | Meyer | ............... | F16B 21/08 411/349 |
| 4,318,208 A | 3/1982 | Borja et al. | | |
| 5,173,026 A | 12/1992 | Cordola et al. | | |
| 5,797,714 A * | 8/1998 | Oddenino | ............ | B60R 13/0206 411/508 |
| 5,857,244 A | 1/1999 | Edwards et al. | | |
| 6,752,950 B2 | 6/2004 | Clarke | | |
| 6,916,145 B2 * | 7/2005 | Lydan | ................. | B29C 45/1635 249/63 |
| 7,019,215 B2 | 3/2006 | Arai | | |
| 7,045,715 B2 * | 5/2006 | Ono | ................... | B60R 16/0215 174/135 |
| 7,152,281 B2 * | 12/2006 | Scroggie | ............. | B60R 13/0206 24/297 |
| 7,878,749 B2 * | 2/2011 | Edland | .................. | F16B 21/086 24/297 |
| 7,988,105 B2 * | 8/2011 | Kamiya | ................ | F16B 21/088 248/71 |
| 7,992,875 B2 | 8/2011 | Kubo et al. | | |
| 8,037,582 B2 | 10/2011 | Okada et al. | | |
| 8,240,622 B2 | 8/2012 | Hohmann et al. | | |
| 8,561,265 B2 * | 10/2013 | Benedetti | .............. | F16B 21/086 24/297 |
| 8,671,527 B2 * | 3/2014 | Scroggie | ............... | F16B 5/0642 24/297 |
| 8,883,059 B2 * | 11/2014 | Lewis | ..................... | F16B 5/065 264/250 |
| 9,079,341 B2 * | 7/2015 | Risdale | ............... | B29C 45/1635 |
| 2003/0159256 A1 | 8/2003 | Clarke | | |
| 2005/0150087 A1 * | 7/2005 | Lydan | .................. | B29C 45/1676 24/297 |
| 2006/0112660 A1 | 6/2006 | Mugushima et al. | | |
| 2006/0231690 A1 * | 10/2006 | Cooley | ................. | F16B 21/086 248/71 |
| 2008/0066266 A1 | 3/2008 | Scroggie et al. | | |
| 2008/0141501 A1 | 6/2008 | Kuroda | | |
| 2009/0060681 A1 | 3/2009 | Nakanishi | | |
| 2009/0100761 A1 | 4/2009 | Hashimoto et al. | | |
| 2015/0322985 A1 * | 11/2015 | Scroggie | ............. | F16B 19/008 29/428 |
| 2017/0102018 A1 * | 4/2017 | Kanie | ................... | F16B 5/0657 |
| 2017/0307003 A1 | 10/2017 | Edland | | |

FOREIGN PATENT DOCUMENTS

| | | |
|---|---|---|
| EP | 1895171 A2 | 3/2008 |
| EP | 2042363 A2 | 4/2009 |
| GB | 1144927 | 3/1969 |
| WO | WO 2011043352 A1 | 4/2011 |
| WO | WO 2013/165948 A1 | 11/2013 |
| WO | WO 2014/043145 A1 | 3/2014 |
| WO | WO 2014/099444 A1 | 6/2014 |
| WO | WO 2015030175 A1 | 3/2015 |
| WO | WO 2015/080153 A1 | 6/2015 |
| WO | WO 2015/191405 A1 | 12/2015 |
| WO | WO 2018/111524 A1 | 6/2018 |

OTHER PUBLICATIONS

Office Action in counterpart European Patent Application No. 18172788.4 dated Jan. 8, 2020.

* cited by examiner

SEALING CLIP

FIELD

The present disclosure relates to fasteners and more particularly to push clip fasteners with sealing functionality.

BACKGROUND

This section provides background information related to the present disclosure which is not necessarily prior art.

Various types of fasteners are often used to mount components to various surfaces in order to secure such components to mating components. One type of fastener is a clip. Push clips are of particular use to aid in the assembly process whereby a first mountable component fit with a clip is pushed into an opening of a mating component in order to be secured in position. One application for clips is in the context of securing mountable components at a desired location in a vehicle. Such mountable components on vehicles can include weatherstrips, interior trim components, exterior trim components, fascia components and various other covers, ornamentation and the like. In the context of components that are exposed to the elements and/or are located at sealed interfaces, clips often need to seal such locations and interfaces from intrusion of air, water or other contaminants.

Some applications for clips exist in the context of mating components of a vehicle such as in environments related to the closures of a vehicle. Such environments exist in the interfaces of doors, trunk lids, liftgates, hoods and vehicle bodies. At such interfaces, it is common to have weatherstrips attached to one surface of the interface to seal such interface from the intrusion of air and water. Clips that are used at these types of interfaces can be particularly challenging to seal because when the mating components (such as an inner door frame and the bodyside of the vehicle) are brought together, the weatherstrip that is secured in the interface is subjected to forces that can bend or rotate clips in the interface. Side loading or loading that occurs in a direction substantially perpendicular to the longitudinal direction of door weatherstrips is one type of loading that can be particularly challenging for clips to maintain a watertight seal. The bending or rotation of the clips caused by side loading can compromise the ability of the clips (and the weatherstrip) to seal the interface from the intrusion of air, water or other contaminants.

SUMMARY

This section provides a general summary of the disclosure, and is not a comprehensive disclosure of its full scope or all of its features.

In one embodiment of the present disclosure, a clip includes a base that is elongated in a longitudinal direction, a post connected to the base at a proximal end of the post. The post extends away from the base and terminates at a distal end of the post. The clip further includes a first finger and a second finger both connected on opposite sides of the post and extending away from the post toward the base in the longitudinal direction. The clip also includes an elongated foot connected to the base on a side of the base opposite the first finger. The clip also includes an umbrella seal connected to the base that has a sealing lip around a periphery of the base that extends away from the base. The base, the elongated foot and the first finger and the second finger of the clip extend along the same longitudinal direction of the clip.

In some embodiments, the clip can include an anti-rocking pad connected to the base adjacent the proximal end of the post. The first anti-rocking pad is raised away from the base in the same direction as the post and can extend from the post in the longitudinal direction.

In some embodiments, the clip can include a rib connected to the post with a first engagement edge wherein the first engagement edge is angled outward from the distal end of the post and terminating at the base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
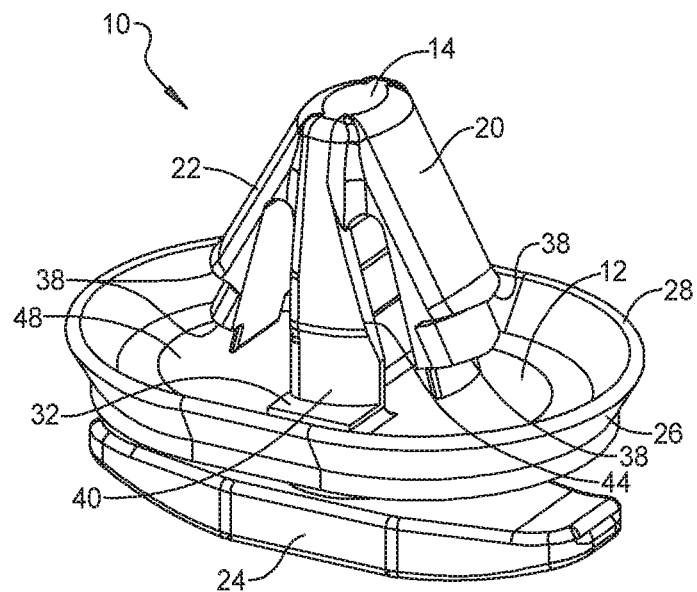
FIG. 1 is an isometric view of one example clip in accordance with the present disclosure.

FIG. 1 shows one example clip 10 in accordance with the present disclosure. In this example, the clip 10 includes a base 12, a post 14, a first finger 20, a second finger 22, a foot 24 and an umbrella seal 26. The base 12 is the central member of the clip 10 from which various other features of the clip 10 extend from or are attached to as will be hereinafter described. The base 12, in this example, includes an insertion-side surface 48 and a connecting-side surface 50. The insertion-side surface 48 is oriented on one side of the base 12. The connecting side surface 50 is oriented substantially parallel to the insertion-side surface 48 and on an opposing side of the base 12. The base 12, in this example embodiment, is elliptical or oval in shape and the major axis of the ellipse or the elongated portion of the oval is aligned with the longitudinal direction of the clip 10. As will be explained in more detail below, this orientation of the base 12 provides advantages to resist a rotation of the clip 10 due to a side load. In other embodiments of the clip 10, however, other shapes of the base 12 can be used to account for different packaging restraints, different mating components, different loading applications or other environments.

Figure 2:
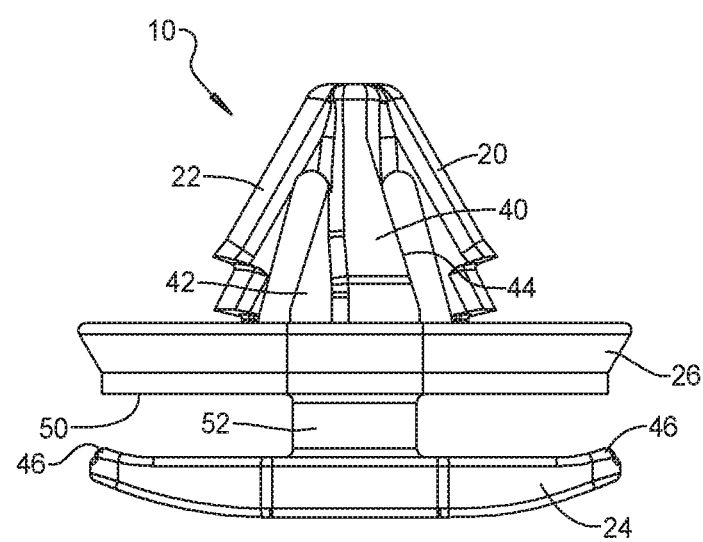
FIG. 2 is a front view of the clip shown in FIG. 1.
Figure 5:
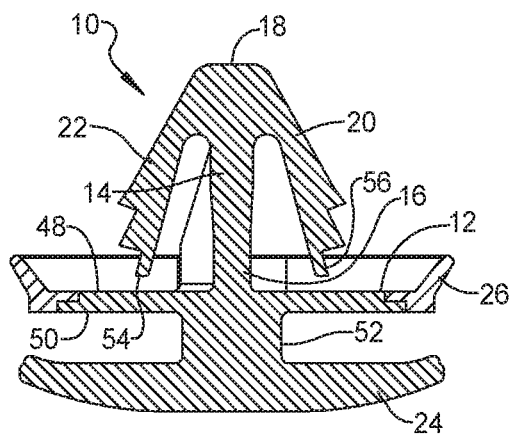
FIG. 5 is a sectional view of the clip shown in FIG. 1 along the cut plane indicated in FIG. 4.

As further shown in FIG. 1, the clip 10, in this example, includes a foot 24. The foot 24 extends away from the connecting-side surface 50 of the base 12. The foot 24 is an element of the clip 10 whereby the clip 10 can be secured to a mountable component. As can be appreciated, after the clip 10 is secured to a mountable component via the foot 24, the mountable component can be installed to a mating component by inserting the elements of the clip 10 opposite of the foot 24 into a panel opening 62 on the mating component. Referring back to FIG. 1 and as also shown in FIGS. 2 and 5, the foot 24 includes an extension 52. The extension 52, in this example, is cylindrical and is connected to the connecting-side surface 50 of the base 12. The extension 52 separates the retention portion of the foot 24 from the base 12. The extension 52 can be of varying lengths according to the application of the clip 10. The extension 52 is, in one example, at least as long as the thickness of the mountable component to which the foot 24 is connected. The foot 24 may be angled or curved at its distal ends 46 such that the distal ends 46 bend or angle back toward the connecting-side surface 50. The distal ends 46 of the foot 24 may also be sloped or tapered on the sides of the foot 24. This type of configuration can make the foot 24 more easily inserted or secured to a mountable component.

Figure 6:
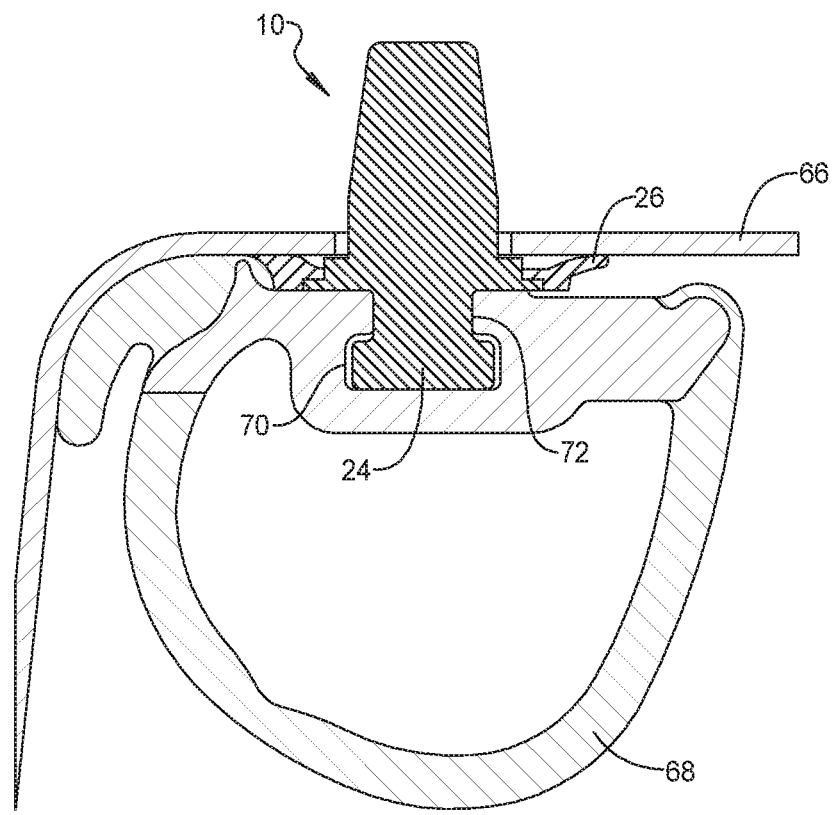
FIG. 6 is a sectional illustration of the clip shown in FIG. 1 as installed in one example environment.

In one application of the clip 10 shown in FIG. 6, the clip 10 is used to retain a weatherstrip to an inner door panel 66 or an inner door frame. An example weatherstrip 68 is shown in FIG. 6 and includes a channel 70 that extends longitudinally through the weatherstrip 68. The clip 10 is installed into the weatherstrip 68 by inserting the foot 24 through apertures 72 in the weatherstrip 68 that are in communication with the channel 70. In this manner, one or more of the clips 10 can be installed in the weatherstrip 68 and maintained at predetermined locations along its length for subsequent insertion into the panel openings 62 in the inner door panel 66.

As shown in FIG. 1, the foot 24, in one example, is an elongated element. The foot 24 is elongated in that it has a length that is greater than its width. For purposes of the present disclosure, the longitudinal direction means the direction along a center of the elongated length of the foot 24 and the transverse direction means a direction substantially perpendicular to the longitudinal direction. As further shown in this example, the base 12 is elongated in the longitudinal direction corresponding with the elongated length of the foot 24.

Referring back to FIG. 1, the clip 10 also includes a post 14. The post 14 extends away from the insertion-side surface 48 of the base 12 such that it extends from the opposite side of the base 12 relative to the foot 24. The post 14 is connected to the base 12 at a proximal end 16 and terminates at a distal end 18. Further connected to the post 14, in this example, are the elements of the clip 10 that permit the clip 10 to be secured in an opening of a mating component such as the panel opening 62 of the panel 64. In this example, the post 14 supports a first finger 20 and a second finger 22. The first finger 20 and the second finger 22 are substantially symmetrical with respect to each other and each extend back toward the base 12 from the distal end 18 on opposing sides of the post 14. As can be seen in FIG. 5, the first finger 20 and the second finger 22 extend away from the post 14 and back toward the base 12 to create a gap between free ends 54, 56 and the post 14. The gap between the free ends 54, 56 and the post 14 permits the first finger 20 and the second finger 22 to flex toward the post 14 during insertion of the clip 10 into the panel 64 at the panel opening 62. After passing through the panel opening 62 on the panel 64, the first finger 20 and the second finger 22 flex back toward their original positions to retain the clip 10 in a position relative to the panel 64.

Figure 3:
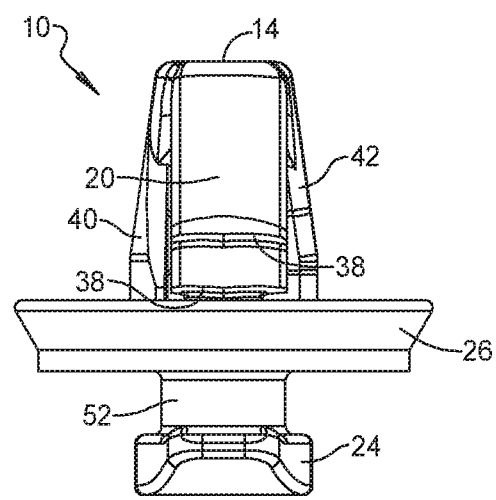
FIG. 3 is a side view of the clip shown in FIG. 1.
Figure 4:
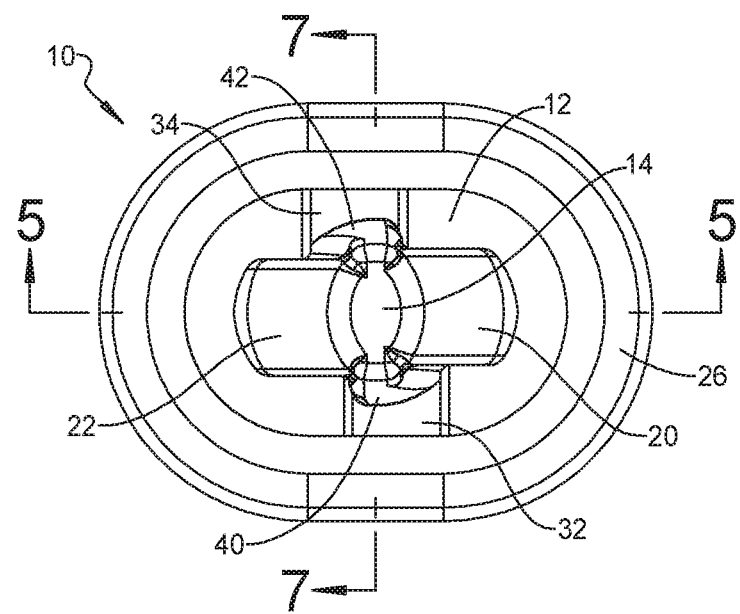
FIG. 4 is a top view of the clip shown in FIG. 1.
Figure 8:
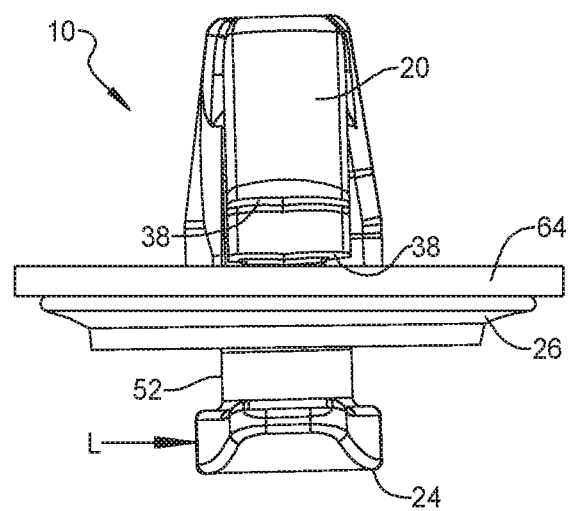
FIG. 8 is a side view of the clip shown in FIG. 1 installed on an example panel.

As can be further seen in FIGS. 1 and 3, the first finger 20 and the second finger 22 include one or more knuckles 38. In the example shown, the first finger 20 and the second finger 22 include two knuckles along an outer surface. The knuckles 38 are steps in the outer surface of the first finger 20 and the second finger 22 that assist in retaining the clip 10 in a desired position upon insertion into the panel 64. As can be appreciated, as the first finger 20 or the second finger 22 flex toward the post 14 and pass through the panel opening 62 in the panel 64, the first finger 20 or the second finger 22 flexes back toward an original position after the knuckle 38 has passed through the opening 62 in the panel 64. A contact surface, such as one leg of the v-shaped profile of the knuckle 38, is then located adjacent the panel 64 as shown in FIG. 8. Multiple knuckles 38 may be included along an outer surface of the first finger 20 and the second finger 22. Additional knuckles 38 provide additional functionality to the clip 10 in that the clip 10 can be used with different thickness of panels to retain the clip 10 in a desired position. This functionality can be particularly useful for retaining mountable components to mounting locations made from variable thickness materials, such as for example, inner surfaces of vehicle doors.

Figure 10:
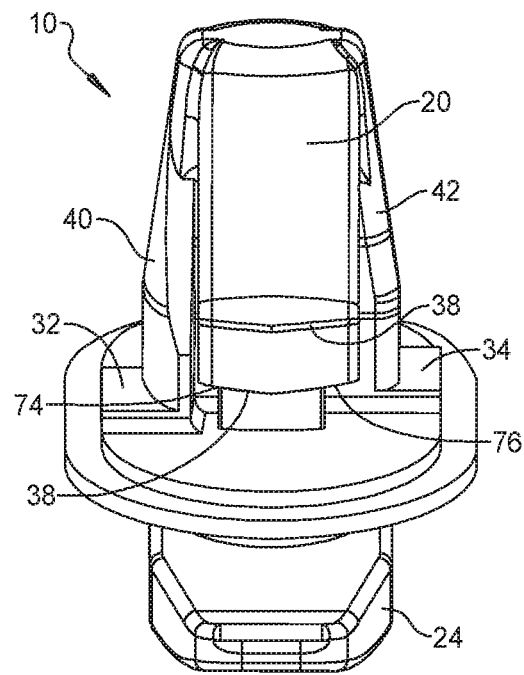
FIG. 10 is side view of the clip shown in FIG. 1 (without an umbrella seal) viewed normal to a finger showing an example profile of a knuckle.

As shown in FIG. 8 and in more detail on FIG. 10, an example profile of knuckles 38 is shown. In this example, the knuckles 38 have a v-shaped profile whereby each leg of the v-shape is sloped toward the distal end of the post 14 from the center of the knuckle 38. In the example shown in FIG. 10, the knuckle 38 includes a first leg 74 and a second leg 76. As can be seen, the first leg 74 and the second leg 76 of the v-shape creates a surface on the knuckle 38. This configuration of the knuckle 38 provides additional resistance to the rotation of the clip 10 that may occur if the clip 10 is subjected to a side load in the transverse direction as will be described in further detail below.

As further shown in FIG. 2, the first finger 20 and the second finger 22, in this example, extend away from the distal end 18 of the post 14 in the longitudinal direction of the clip 10. In this manner, the first finger 20 and the second finger 22 extend in substantially the same direction as the elongated portion of the foot 24. The clip 10, in this example, also includes a first anti-rocking pad 32 and a second anti-rocking pad 34. The first anti-rocking pad 32 and the second anti-rocking pad 34 are formations extending away from the base 12 that resist lateral deflection of the clip 10 in a transverse direction as lateral or side forces may be imposed on the clip 10 during use.

Figure 7:
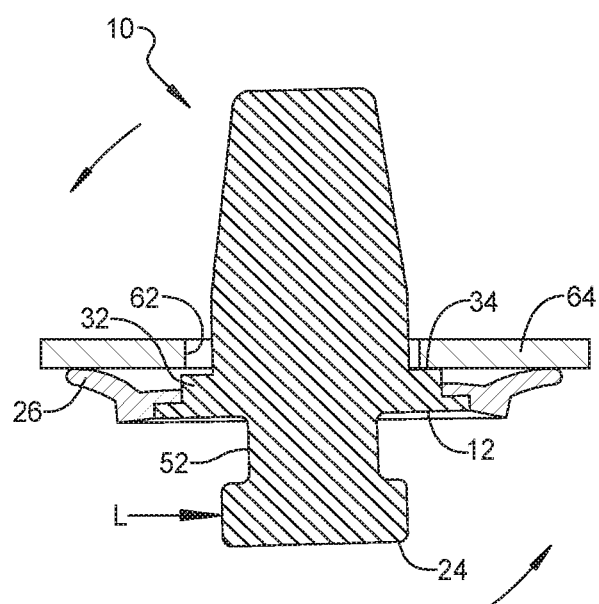
FIG. 7 is a sectional illustration of the clip shown in FIG. 1 installed on an example panel.

As shown in FIG. 1 and FIG. 7, the first anti-rocking pad 32 and the second anti-rocking pad 34 are raised surfaces that are raised away from the insertion-side surface 48 in this example embodiment. In other embodiments, the first anti-rocking pad 32 and the second anti-rocking pad 34 may be substantially co-planar with the insertion-side surface 48 of the base 12. A first side of the first anti-rocking pad 32 and the second anti-rocking pad 34 are adjacent to post 14. The first anti-rocking pad 32 and the second anti-rocking pad 34 also extend away from the post 14 on the base 12 in the transverse direction. In this manner, the first anti-rocking pad 32 and the second anti-rocking pad 34 are oriented substantially perpendicular to the extending (or longitudinal) direction of the first finger 20 and the second finger 22.

In other examples, the clip 10 can include additional anti-rocking pads or anti-rocking pads positioned differently from that described above. In an alternate example (not shown), the clip 10 includes one or more anti-rocking pads that extend away from the post 14 on the base 12 in the longitudinal direction. The anti-rocking pads, in this example, are aligned with the first finger 20 and the second finger 22 and are raised away from the insertion-side surface 48 of the base 12. In still another example, the clip 10 includes anti-rocking pads that extend away from the post 14 in both the longitudinal and transverse directions.

Figure 9:
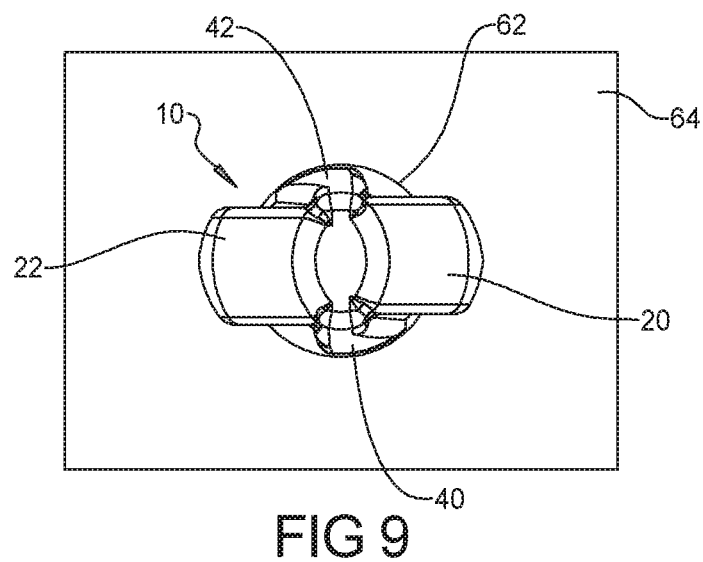
FIG. 9 is a top view of the clip shown in FIG. 1 installed on an example panel.

As shown in FIG. 9, on the transverse sides of the post 14, the clip 10 may also include a first rib 40 and a second rib 42. The first rib 40 and the second rib 42 are elements of the clip 10 that resist undesirable transverse movement of the clip 10 after it is inserted within the panel opening 62 on the panel 64. As shown in FIG. 1, the first rib 40, in one example, includes a first engagement edge 44 that extends in the longitudinal direction away from the post 14 at an angle before it meets the insertion-side surface 48 of the base 12. As such, the first rib 40 has a substantially triangular shape when viewed from the side. As shown in FIG. 9, an outer surface of the first rib 40 has an arcuate outer surface that corresponds to the panel opening 62 in the panel 64 into which the clip 10 is inserted. The second rib 42 has substantially the same shape as previously described and is positioned opposite the first rib 40 on the opposite side of the post 14. As can be appreciated and as shown in FIG. 9, after the clip 10 is inserted within the panel opening 62 of the panel 64, the first rib 40 and the second rib 42 occupy the space between the post 14 and an inner surface of the panel opening 62. In this manner, the clip 10 is limited from moving transversely within the panel opening 62.

Referring back to FIG. 1, the clip 10 also includes an umbrella seal 26. The umbrella seal 26 provides sealing around the panel opening 62 into which the clip 10 is inserted in the panel 64. In one example, the umbrella seal 26 extends around a periphery of the base 12. The umbrella seal 26 also includes a sealing lip 28. The sealing lip 28 extends away from the base 12 in the same direction as the post 14. The sealing lip 28, in this example, extends away from the insertion-side surface 48 of the base 12 at an angle or along a curved path away from the post 14. The sealing lip 28 is able to flex such that when the clip 10 is inserted in the panel 64, the sealing lip 28 contacts a surface of the panel and flexes when the clip 10 is in an engaged position in the panel 64 as shown in FIG. 7. In this manner, the umbrella seal 26 provides sealing around the panel opening 62 in the panel 64. As shown in FIG. 5, the outer edge of the sealing lip 28 can have a rounded profile such that when the sealing lip 28 contacts the panel a robust sealing interface is created.

The clip 10, in one example, is made of two different materials. In this example, the clip body shown in FIG. 10 is made of one material. The clip body includes the base 12, the post 14, the first finger 20, the second finger 22, and the foot 24. The seal body is made of the second material. Seal body includes the umbrella seal 26 with the sealing lip 28. The two different materials have differing mechanical properties and in one example, the first material is a relatively rigid material and the second material is a relatively resilient material. In one such example embodiment, the clip body is molded of the first relatively rigid material, such as an acetal copolymer and the seal body is molded of the second relatively resilient material, such as a thermoplastic elastomer. In such an example embodiment the relatively resilient material has a durometer of 90. In another example, the relatively resilient material has a durometer in the range of 50 to 100 on the Shore A scale or in the range of 0 to 60 on the Shore D scale.

The clip 10 can be molded in a two-shot molding process wherein clip body is molded of the first material in the first shot and seal body is molded of the second material in the second shot. In other examples, other plastics and rubbers can also be used or the clip 10 can be molded of a single suitable material.

The foregoing described clip 10 improves over existing clip designs. Existing configurations of clips do not provide robust sealing interfaces at their locations of engagement with a panel, especially in circumstances in which a clip is subjected to a side or transverse directed force. FIGS. 7 and 8 illustrate one example of the clip 10 subjected to a side load L. When subjected to side load L, the clip 10 tends to rotate about an axis parallel to the longitudinal axis. As such rotation occurs, one side of the clip 10 (the side opposite the direction of side load L) is compressed toward the panel 64. The opposite side of the clip 10 moves away from the panel 64. In existing designs of clips without robust sealing and movement limiting features, the existing clip could rotate such that a side of an existing clip is no longer contacting the panel 64. If no element of a clip is contacting the panel 64 on one or more sides, water or air can enter the panel opening 62 of the panel 64. The ingress of water or air results in a leak or in wind noise.

The clip 10 of the present disclosure addresses the foregoing described disadvantages of existing clip designs by providing a robust sealing solution that prevents the ingress of air or water in situations of side loading of the clip 10. When the clip 10 is subjected to side load L, one or more elements of the clip 10 resists or limits the rotation of the clip 10 such that a robust sealing interface is maintained. The elements that resist or limit rotation of the clip 10 include the first anti-rocking pad 32 and the second anti-rocking pad 34, the orientation of the first finger 20 and the second finger 22, the profile of the first finger 20 and the second finger 22 and the umbrella seal 26.

The first element resisting or limiting rotation of the clip 10 is the first anti-rocking pad 32 and the second anti-rocking pad 34. As shown in FIG. 6, when the clip 10 is in a non-side loaded condition, the anti-rocking pads 32, 34 are spaced from second component. In other words, there is a small gap between the anti-rocking pads 32, 34 and the surface of the second component adjacent the opening in the non-side loaded condition. As shown in FIG. 7, when the clip 10 is subjected to side load L, the second anti-rocking pad 34 contacts the panel 64 to prevent excessive rotation of the clip 10. As can be appreciated, if side load L is exerted on an opposite side of the clip 10, the first anti-rocking pad 32 will function in a similar manner to limit the rotation.

A second element of the clip 10 that resists or limits rotation of the clip 10 is the orientation of the first finger 20 and the second finger 22. As stated earlier, the first finger 20 and the second finger 22 are oriented such that they extend along the longitudinal direction of the clip 10. In such an orientation, both the first finger 20 and the second finger 22 are able to resist the rotation of the clip 10 since elongated surfaces of both fingers can remain in contact with the panel 64. As can be appreciated, if the first finger 20 and the second finger 22 were oriented differently, such as 90 degrees from the previously described orientation, one of the fingers would lift away from the panel 64 as the clip 10 would be rotated when subjected to a side load L.

Another element of the clip 10 that resists or limits rotation of the clip 10 is the profile of the knuckles 38 of the first finger 20 and the second finger 22. As previously described, one example profile of the knuckles 38 is a v-shaped profile as shown in FIG. 10. With such an example profile, one leg of the v-shape will come into contact with the panel 64 when the clip 10 is rotated. Alternatively, the other leg of the v-shape would come into contact with the panel 64 if the clip 10 were rotated in the opposite direction. The example v-shape profile causes a larger surface area of the first finger 20 and the second finger 22 to come into contact with the panel 64 during rotation of the clip 10. Such an increased surface area increases the ability of the clip 10 to resist or limit rotation.

Still another element of the clip 10 that resists or limits rotation of the clip 10 is the umbrella seal 26. The umbrella seal 26 is elongated or extended in the longitudinal direction providing an enlarged contact area of the umbrella seal 26 that is compressed on the side of the clip 10 opposite the location of side load L as shown in FIG. 8. This compression of the longitudinally extending umbrella seal 26 helps resists the rotation of the clip 10.

Each of the previously described elements of the clip 10, alone or in any combination, can operate to resist the rotation of the clip when subjected to a side load L. FIG. 6 illustrates one example application of the clip 10. As previously discussed, the clip 10 can be used to secure a mountable component at the panel opening 62 on the panel 64. In one example application, the mountable component is a weatherstrip and the panel 64 is an inner door panel. As shown, clip 10 can be used to attach the weatherstrip 68 to the inner door panel 66. In this example application, the foot 24 is installed into a channel on the weatherstrip 68. The channel on the weatherstrip 68 maintains an orientation of the clip 10. Multiple clips 10 that are installed along a length of the weatherstrip 68 can then be pushed into circular openings on the inner door panel 66. As can be seen and when inserted, the umbrella seal 26 is compressed to create a sealing interface around the opening in the inner door panel 66. In this type of application and when the door is closed, clip 10 is subjected to a side load due the bodyside of the vehicle contacting the bulb of the weatherstrip 68. Such side loads can rise to 38 N at each clip without breaking the seal. The foregoing structure of the clip 10 restricts the rotation of the clip 10 and maintains a robust sealing interface that prevents the ingress of air and water into the vehicle even when subjected to such side loads. As can be appreciated, the clip 10 can be used in other applications that may experience side loading to provide similar robust sealing.

Example embodiments are provided so that this disclosure will be thorough, and will fully convey the scope to those who are skilled in the art. Numerous specific details are set forth such as examples of specific components, devices, and methods, to provide an understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing descriptions of the example embodiments and example applications have been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clip comprising:
a base;
a post connected to the base at a proximal end and extending away therefrom;
a first finger connected to the post and extending away from the post toward the base and in a longitudinal direction;
a second finger connected to the post opposite the first finger and extending away from the post toward the base and in the longitudinal direction;
an elongated foot connected to the base on a side opposite the post, the elongated foot having an overall shape that is elongated in the longitudinal direction;
an umbrella seal connected to the base that includes a sealing lip around a periphery of the base that extends away from the base; and
a first anti-rocking pad extending from the base adjacent the proximal end of the post and disposed in a transverse direction from the post that is substantially perpendicular to the longitudinal direction.

2. The clip of claim 1 wherein the base has an overall shape that is elongated in the longitudinal direction.

3. The clip of claim 1 wherein the first anti-rocking pad extends from the proximal end of the post in the transverse direction.

4. The clip of claim 1 wherein the overall shape of the elongated foot has a first width defined in the transverse direction and an overall shape of the base has a second width defined in the transverse direction, the first width being less than the second width.

5. The clip of claim 3 further comprising a second anti-rocking pad extending from the base adjacent the proximal end of the post and opposite the post from the first anti-rocking pad.

6. The clip of claim 5 wherein the second anti-rocking pad extends from the proximal end of the post in the transverse direction.

7. The clip of claim 1 wherein the first finger includes one or more retention knuckles along an outer surface of the first finger, the one or more retention knuckles configured to retain a mating part between the base and the one or more retention knuckles.

8. The clip of claim 1 further comprising a first rib connected to the post and having a first engagement edge, the first engagement edge being angled outward from the post and terminating at the base.

9. The clip of claim 8 further comprising a second rib connected to the post and having a second engagement edge, the second engagement edge being angled outward from the post and terminating at the base.

10. The clip of claim 1 wherein the base, the post, the first finger, the second finger and the elongated foot are made of a first relatively rigid material and the umbrella seal is made of a second relatively resilient material, the first relatively rigid material and the second relatively resilient material being two materials integrated together using a two-shot manufacturing process.

11. A clip for mounting a first component to an opening of a second component comprising:
a clip body comprising:
a base having an overall shape that is elongated in a longitudinal direction;
a post connected to the base at a proximal end and extending away therefrom;
a first finger connected to the post and extending away from the post toward the base in the longitudinal direction;
a second finger connected to the post and extending away from the post toward the base in the longitudinal direction;
an elongated foot connected to the base on a side opposite the post, the elongated foot having an overall shape that is elongated in the longitudinal direction and designed to secure the clip to the first component; and
a first anti-rocking pad connected to the proximal end of the post and extending away from the post on the base; and
a seal body comprising:
an umbrella seal connected to the base that includes a sealing lip around a periphery of the base that extends away from the base;
wherein the first finger and the second finger are designed to engage the opening in the second component.

12. The clip of claim 11 wherein the first anti-rocking pad is disposed in a transverse direction from the post that is substantially perpendicular to the longitudinal direction, and the first anti-rocking pad is designed to be spaced from the second component in a non-side loaded condition and to engage the second component adjacent the opening when the clip is subjected to a side load.

13. The clip of claim 12 further comprising a second anti-rocking pad connected to the proximal end of the post opposite to the first anti-rocking pad.

14. The clip of claim 11 further comprising a second anti-rocking pad connected to the proximal end of the post opposite to the first anti-rocking pad, wherein the second anti-rocking pad is designed to be spaced from the second component in an unloaded condition and to engage the second component adjacent the opening when the clip is subjected to a longitudinal load.

15. The clip of claim 14 wherein the second anti-rocking pad extends outward along the base from the post in a direction substantially parallel to the longitudinal direction.

16. The clip of claim 11 further comprising a first rib connected to the post and having a first engagement edge, wherein the first engagement edge is angled outward from the post toward the base and is designed to engage the opening in the second component to limit movement of the clip in the opening.

17. The clip of claim 11 wherein the clip body is made of a relatively rigid material and the seal body is made of a relatively resilient material.

18. The clip of claim 11 wherein the first component is a door weatherstrip and the second component is a door or a door frame component.

19. The clip of claim 11 wherein the elongated foot is designed to a channel in a weatherstrip.

20. A method of manufacturing the clip of claim 11 comprising molding the clip body of a relatively rigid material in a first shot of a two-shot molding process and molding the seal body of a relatively resilient material in a second shot of the two-shot molding process.

* * * * *